Patented Feb. 28, 1928.

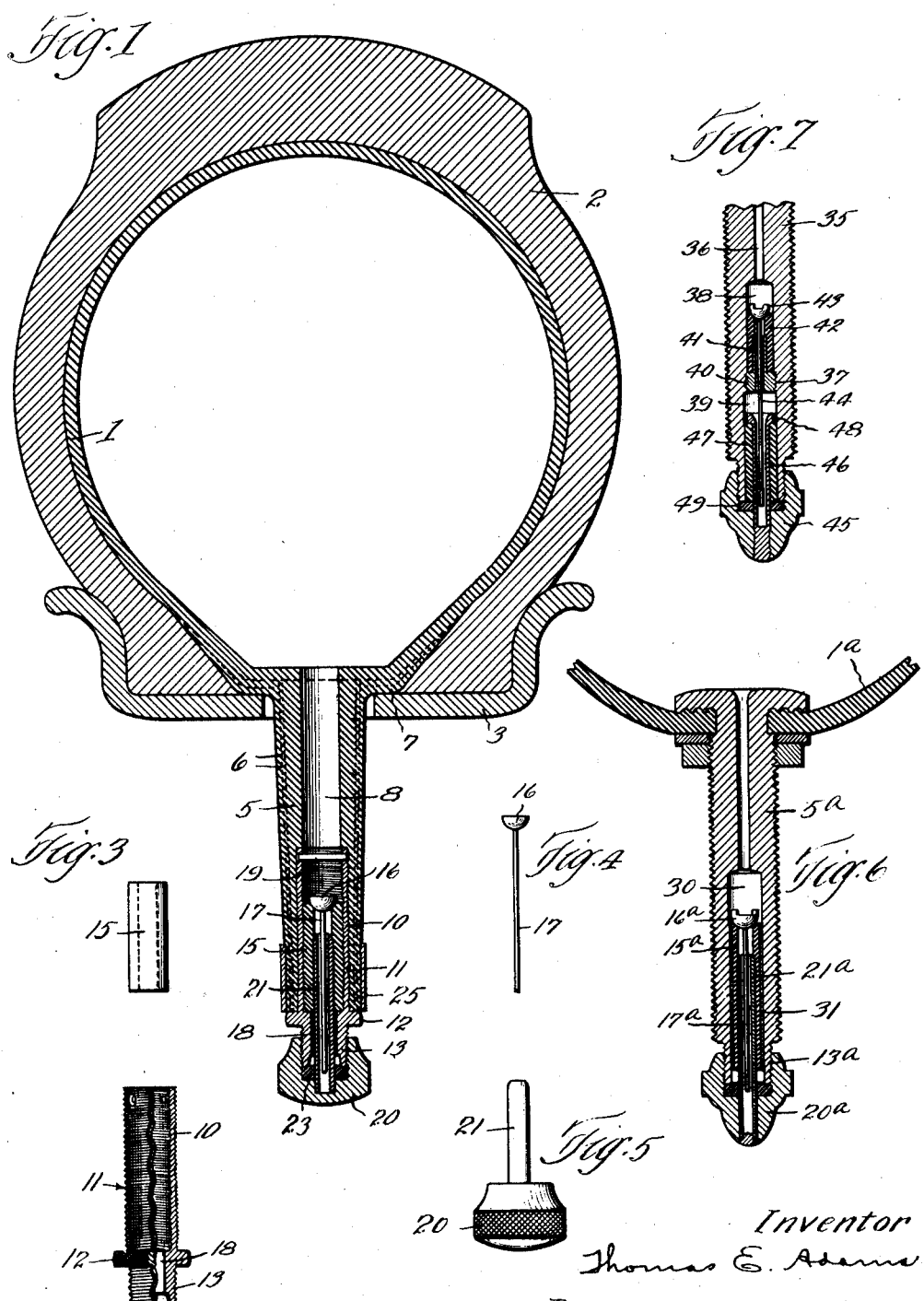

1,660,902

UNITED STATES PATENT OFFICE.

THOMAS EDGAR ADAMS, OF CLEVELAND, OHIO.

TIRE CLOSURE.

Application filed September 19, 1924. Serial No. 738,700.

This invention relates to an improved closure for pneumatic tires.

Among the objects of my invention are:

First, the provision of an improved closure for pneumatic tires which will maintain the inflation of the tire until an accidental injury necessitates repairs;

Second, the provision of an improved closure for pneumatic tires that is simple, cheap and convenient of incorporation in the tire, the same requiring no marked departure from present manufacturing methods;

Third, to preferably incorporate my improved closure in a stem of flexible material which is vulcanized to the tire and thus becomes, in effect, an integral part of the tire thereby eliminating all possibility of leaky joints;

Fourth, to provide an improved closure for pneumatic tires that involves a plurality of seals or safeguards against the escape of air through the closure;

Fifth, to provide an improved closure for pneumatic tires which will permit the tire to be quickly inflated, and, when occasion requires, will permit the rapid escape of air from the tire;

Sixth, to provide an improved closure for pneumatic tires which, while differing materially from the present type of tire valve in construction and appearance, is manipulated in precisely the same way as the present valve when inflating or deflating the tire and when using the tire gauge, thus requiring no education of the public nor causing annoyance or inconvenience in substituting it for the present type of valve.

The foregoing objects, with others hereinafter appearing, are attained in the embodiments of the invention illustrated in the drawings accompanying and forming a part hereof and wherein Fig. 1 is a transverse section through a tire incorporating my improved closure and showing the tire as mounted upon a rim; Fig. 2 is a sectional side elevation of the valve body; Fig. 3 is a side elevational view of the elastic liner for the valve body; Fig. 4 is an elevational view of the valve; Fig. 5 is a similar view of the combined stopper and dust cap embodied in my improved closure; Fig. 6 is a view, similar to Fig. 1, showing my improvements incorporated in a metal stem; and Fig. 7 shows a further modification.

In the practical application of my invention I follow as far as practicable the present methods of tire construction, simply substituting for the standard tire stem and valve, the closure of my invention. In Fig. 1 an inner tube 1 is shown as enclosed by a standard casing 2 which is mounted upon a rim 3.

Applied to the inner tube 1, in place of the common valve stem, is a stem 5 of flexible material, preferably rubber, which may be reinforced with fabric as indicated at 6. The stem terminates at one end in a base 7 that is adapted to be vulcanized to the inner tube. The stem 5 has a bore 8 and the inner tube has an aperture registering with said bore. Forced into the outer end of the tubular stem 5 is the barrel 10 of a valve body that is designated generally by the numeral 11. The exterior of the barrel 10 is preferably threaded to facilitate its entrance into the bore of the stem 5 and to increase its hold therein. This barrel may also be used in a metallic stem by fitting the stem to receive it. Thus by a single and obvious change in the valve stem, which may be easily and quickly made by a mechanic with ordinary equipment, my invention may be used as a replacement of the prevailing type of tire valve. To insure a leak proof joint between the barrel and the wall of the stem, there may be a layer of cement or the like between the two. Adjacent the outer end of the barrel 10, the valve body is formed with a flange 12 which engages the end of the stem 5 and beyond the flange the body is reduced and threaded to provide a nipple 13 that is adapted to receive standard hose connections.

A tubular liner 15, shown in detail in Fig. 3, occupies the interior of the barrel 10, the same being formed of suitable elastic material, such as rubber. To more effectively secure the liner within the barrel the interior of the barrel is threaded and when the liner is forced into the barrel its exterior conforms in shape to the adjacent surface of the barrel. In lieu of this means of holding the liner in place, or in addition thereto if desired, cement may be employed for the purpose. The liner 15 terminates a suitable distance below the upper end of the barrel 10, and occupying the space above the liner is a valve 16 having a pin 17 that extends through the duct of the liner 15 and through an orifice 18 in the outer end of the valve body. The valve is arranged to seat against the inner end of the liner 15 and when so seated the lower extremity of its pin 17 protrudes a short distance beyond the end of the valve body. To prevent undue inward movement of the valve 16, I provide an abutment 19 in the nature of a pin that extends across the inner end of the valve body.

Designed for application in the usual way to the nipple 13 is a dust cap 20 which incorporates a straight cylindrical stopper 21 that is adapted to be passed freely through the orifice in the outer end of the valve body and forced into the duct of the liner 15, the proportions preferably being such that the bore of the liner is expanded by the stopper and its wall consequently compressed between the stopper and the barrel 10. To facilitate entry of the stopper, its inner end is rounded somewhat. The stopper is made tubular for the accommodation of the valve pin 17 but is closed at its outer end. A washer 23 of suitable packing material occupies the dust cap and is adapted to be compressed against the outer end of the nipple 13 when the dust cap is screwed in place.

A metallic ferrule 25 is preferably applied to the outer end of the stem 5 and is contracted or clinched thereabout for the purpose of more effectively securing the valve body within the stem.

When it is desired to inflate the tire, the dust cap is unscrewed and the stopper is withdrawn from the duct of the liner 15. A suitable air supply may then be applied to the nipple 13 in the usual manner. This will result in the valve 16 being lifted from its seat by the inrush of air through the stem into the tire. When it appears that the desired inflation has been effected, the air supply is removed, whereupon the internal pressure seats the valve 16. A reading may be obtained in the usual way by applying a standard tire gauge to the nipple 13, resulting in lifting the valve from its seat and subjecting the gauge to the internal pressure of the tire. If the pressure should be found higher than is desired, the excess air may be liberated by pressing inwardly on the pin 17. When a satisfactory pressure has been attained, the stopper is replaced and the cap 20 is screwed up firmly on the nipple 13 to compress the packing washer 23.

From the foregoing it will be seen that my improved closure is manipulated precisely as is the common type of tire valve. The air passes in both direction more freely with my type of closure than with the present type of valve because the bore of the stem is less obstructed. Also, it will be appreciated that my improved means of closing the duct of the tire stem is absolutely positive and is not subject to leakage due to vibration as, in the former type, with the resultant jostling of the valve upon its seat. It will be seen, too, that my arrangement provides three seals, namely, the valve 16, the stopper 21, and the packing washer 23.

In the modification illustrated in Fig. 6, a metallic stem 5ª is substituted for the stem 5 of the previously described form. This stem has the same appearances as the standard tire stem and is clamped to the inner tube 1ª according to common practice. Within a counterbore 30 of the stem 5ª is a liner 15ª, similar to the liner 15 above described. The liner 15ª, which is of rubber or like material, may, for convenience in assembling, be surrounded by a thin shell 31 of metal or the like. This shell is secured air-tight within the stem by cement or other means. The inner end of the liner 15ª is spaced a suitable distance from the corresponding end of the counterbore 30 and within the enlarged space thus provided is contained a valve 16ª having a pin 17ª that extends downwardly through the bore of the liner and projects beyond the reduced threaded end 13ª of the stem 5ª. A dust cap 20ª is designed for application to the stem and the same carries a tubular stopper 21ª, as in the case of the aforementioned cap 20. A packing washer 23ª occupies the cap for engagement with the end of the stem.

In Fig. 7 I have illustrated a modification of the invention wherein a metallic valve stem 35, having the usual duct 36, is shown as counterbored a suitable distance, the counterbore being divided by a threaded portion 37 into two sections 38 and 39 that differ in diameter by substantially the depth of the thread, the inner section 38 being of the lesser diameter. A tubular screw plug 40, having a neck 41, is adapted to be screwed into the threaded portion 37, and the same carries a rubber tube 42 that is somewhat longer than the neck 41 and is compressed between the neck and the wall of the counterbore. A valve 43 occupies the inner end of the section 38 of the counterbore and seats against the adjacent end of the tube 42. The valve has a pin 44 that extends through the tubular plug 40 and projects slightly beyond the outer end of the stem 35.

The stem 35 is reduced and threaded at its outer end for the application of a dust cap 45. A tubular stem 46 is screwed into the cap, and a sleeve 47, of rubber or the like, surrounds the stem and is confined between a head 48 on the inner end of the stem and a washer 49 of suitable packing material that occupies the cap 45. The sleeve 47 constitutes a straight cylindrical yielding stopper that is adapted to be forced into the outer section 39 of the counterbore when the cap is screwed onto the stem. The valve pin 44 occupies the bore of the stem 46 and said bore is shown as flared at its inner end to facilitate the entrance of the pin into the bore as the stopper is inserted.

Having thus described my invention, what I claim is:—

1. A closure for pneumatic tires comprising a tubular stem, a valve body involving a barrel that occupies the outer end of the bore of the stem, a tubular liner of elastic material within the barrel and having its inner end spaced from the corresponding end of the barrel, the outer end of the barrel having an orifice registering with the duct of the liner, a valve within the inner end of the barrel and arranged to seat against the corresponding end of the liner, the valve having a pin extending through the duct of the liner and through the orifice of the valve body, and a stopper adapted to be passed through the orifice of the valve body and forced into the duct of the liner, said stopper being formed to accommodate the pin of the valve.

2. A closure for pneumatic tires comprising a tubular stem of elastic material, a valve body having a barrel that is disposed within the outer end of the bore of the stem and having a flange engaging the outer end of the stem, the body being formed beyond the flange to provide a nipple, a tubular liner of elastic material within the barrel and having its inner end spaced from the corresponding end of the barrel, a valve within the inner end of the barrel and arranged to seat against the adjacent end of the liner, the valve having a pin extending through the duct of the liner and through an orifice in the outer end of the valve body, an abutment carried by the inner end of the barrel for preventing undue inward displacement of the valve, a stopper designed to be passed through the orifice of the valve body and forced into the duct of the liner, said stopper having a bore which accommodates the valve pin, said bore being closed at its outer end.

In testimony whereof, I hereunto affix my signature.

THOMAS EDGAR ADAMS.